UNITED STATES PATENT OFFICE.

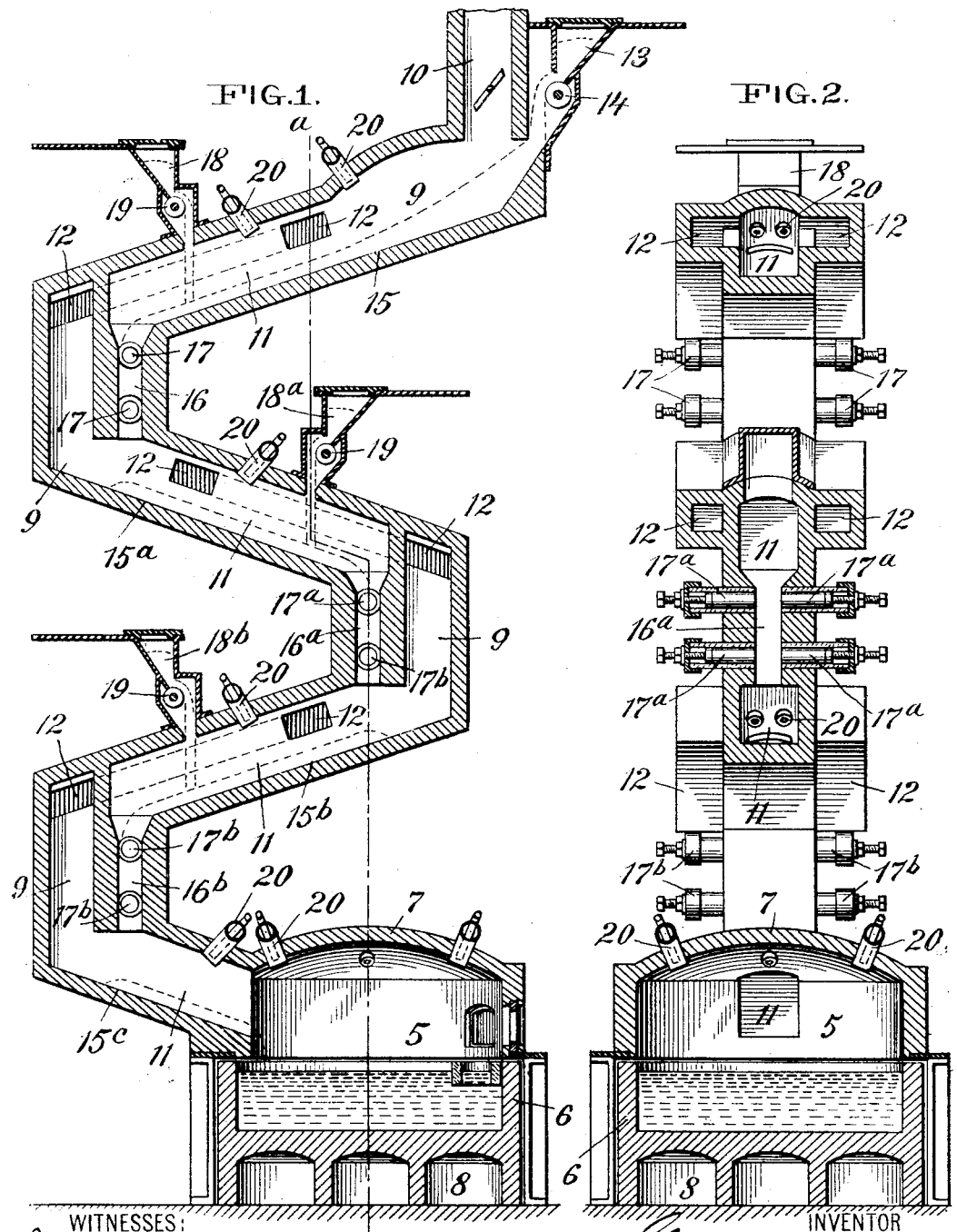

GEORGE HILLARD BENJAMIN, OF NEW YORK, N. Y.

METALLURGICAL FURNACE.

No. 798,258.      Specification of Letters Patent.      Patented Aug. 29, 1905.

Application filed April 25, 1903. Serial No. 154,277.

*To all whom it may concern:*

Be it known that I, GEORGE HILLARD BENJAMIN, a citizen of the United States, residing at New York city, county and State of New York, have invented certain new and useful Improvements in Metallurgical Furnaces, of which the following is a specification.

My invention is especially applicable to furnaces of the type known as "tank-furnaces" and used in melting glass-making materials. It may, however, be used in smelting ores to obtain matte or pig metal and in other corresponding metallurgical operations.

The object of my invention is, primarily, to effect a perfect admixture of the glass-making materials or the separation of a metal from its ore, and, secondarily, to decrease the cost of operation in carrying into effect the manufacture of glass or the separation of a metal from its ore by decreasing the time required to complete the operations of melting or separation and to decrease the quantity of fluxing materials required in the operations.

I will describe my improved furnace as employed in the operation of the manufacture of glass, leaving it to be understood that such operation will be modified when the furnace is used as a smelter of ores.

In the manufacture of glass it has heretofore been the practice to make a mechanical mixture of the glass-making materials to form "batch" prior to the introduction of such materials into the furnace. This method of proceeding has in practice been found objectionable owing to the following observed facts:

First, the fluxes employed in glass manufacture—soda-ash and salt cake—fuse at a much lower temperature than is the case with lime and silica. As a result there is produced over the melted glass in the furnace a liquid layer which is commonly known as "salt water" and which consists of the fused fluxes and the water of crystallization derived from the fluxes, the lime and the silica. The effect of this layer is to interpose until such time as the combined water in it is evaporated a non-conducting blanket between the flame of the furnace and the sand and lime of the glass batch. Further, by reason of the difference in specific gravity between the sand, lime, and flux they divide into layers in the tank of the furnace, and consequently the materials which should be in contact are separated and are not brought in contact until in the process of charging, melting, and withdrawal the material introduced into the furnace has been moved toward the gathering end of the furnace. This process involves what is known in the art as "vertical fining"—that is, it is assumed that the sand and lime which normally fall to the bottom of the furnace are caused to be gradually moved upward into a higher zone in the furnace, this movement being due to the displacement of the sand and lime by the heavy combined materials forming glass gravitating from the highest to the lowest zone of the furnace in the movement of the glass-making materials through the furnace.

Second, the fluxes and lime employed are usually in a more divided condition than the silica, which is in the form of sand. These materials are commonly charged into the furnace by means of a shovel or scoop and float on the top of the melted glass in the furnace. While in this position the fine particles of these materials are taken up by the air-currents and gas-flames traversing the furnace and carried out of the exit-ports and into the regenerators with the effect of cutting down the quantity of flux or lime below the proper combining proportions with the silica, and thus delaying combination of the materials to form glass and also filling and clogging the regenerators, thereby necessitating—to effect proper fusion of the silica—the introduction of fresh fluxing materials and lime and frequent stoppage of the furnace to clear out the regenerators.

Third, owing to the fact, as previously stated, that the glass-making materials distribute themselves in liquid layers within the furnace and are only brought into contact after a certain length of time, it is necessary either to run the furnace at an exceedingly high temperature, which means rapid destruction of the bottom and sides of the furnace by the action of the flux upon the furnace-blocks, or the employment of very long and deep furnaces, a good window-glass furnace at the present time varying in length from seventy to one hundred and ten feet and from four to five and one-half feet in depth of tank. Such a furnace, it will be understood, is costly not only to build but to operate, owing to the immense loss of heat by radiation from its roof and walls.

Fourth, owing to the fact, as above stated, that the flux and lime are carried off by the gas-flames, considerably more flux and lime is usually employed than is necessary to combine with the silica to produce the glass required, and, further, owing to the uncertainty of the amount that will be combined, it is very difficult to obtain a uniform product.

Further objections exist, but those mentioned are sufficient to point out the physical difficulties which are experienced and to illustrate the difference in mode of operation between existing furnaces and that which forms the subject of my invention.

The object of my invention is to overcome the difficulties as stated.

The particular feature of novelty in my improved furnace may be said to consist in a construction whereby charges consisting of flux, fluxes, or a flux or fluxes with lime, or in case where the furnace is used as a smelting-furnace charges of a flux, fluxes alone or combined with carbon may be introduced into the material to be acted upon—i. e., into the sand or ore—at successive points in its line of travel from the place where such material is charged into the furnace until it reaches the tank of the furnace, and, further, in providing means whereby such basic materials will flow or move from the introduction-point to the tank as a thin stream or body, and whereby light materials in the form of flux, fluxes, or carbon are not subjected at the time of their introduction into the furnace to the carrying action of flames or air-currents on their way to the exit-flue from the furnace. My invention further involves various features of construction, which will be pointed out and specifically claimed.

The accompanying drawings, which may be considered as partially diagrammatic, will serve to illustrate the general features of construction of my improved furnace.

Figure 1 is a vertical section. Fig. 2 is a transverse section on the line $a\ a$ of Fig. 1.

In the drawings, 5 indicates a tank-furnace of the usual construction—that is, provided with a tank 6, high crown 7, and cave 8 under the tank. Preferably the tank is circular. I do not limit myself in anywise to the shape of the tank. Extending from one side of the tank and in an upward direction as a series of communicating inclined and vertical passages is a flue or passage 9. This passage serves to permit the products of combustion and surplus heat from the furnace 5 and other heated parts to flow in an upward direction to the chimney-flue 10, or, if desired, through suitable air or gas regenerators, when such regenerators are employed. Under ordinary circumstances I do not make use of such regenerators. The passage or flue 9 is divided into two sets of passages—i. e., the passage 11, over and through which the materials under treatment flow or move, to be finally discharged into the tank 6, and the passage 12, which forms by-paths for the products of combustion flowing to the chimney-flue 10. The purposes of these by-path passages will be described later on.

Situated at the top of the flue or passage 10 is a hopper 13, in the lower end of which is a feed-drum 14. In the manufacture of glass sand is introduced into the flue 9 through this hopper and falls, as indicated by the dotted line, upon the inclined hearth or floor 15. Located at the lower end of the hearth 15 is a vertical passage 16, which forms a part of the passage 11. Arranged transversely and projecting inward from opposite sides of this passage are electrodes 17. Two pairs of electrodes are shown. I do not limit myself in anywise to the number of pairs of electrodes. Immediately under the lower orifice of the passage 16 is a second inclined hearth $15^a$, having its inclination downward in a direction opposite to that of the hearth 15, and at the lower end of this hearth is a second passage $16^a$, similar to the passage 16, having the electrodes $17^a$, and under this passage a third inclined hearth $15^b$ inclined downward in a direction opposite to $15^a$, and at the bottom of this hearth is a third passage $16^b$, containing electrodes $17^b$. Under the bottom of this passage is a fourth inclined hearth $15^c$, which communicates at its lower end with the cavity of the furnace 5.

I have shown in the drawings four inclined hearths and three sets of electrodes. I do not limit myself to the above number of hearths or sets of electrodes, as the number may be increased or diminished. Preferably, however whatever may be the number of the inclined hearths the general relation of the hearths as regards their inclination relative to each other should be maintained. The object of inclining the hearths relative to each other is, in effect, to reverse the exposed surface of the material flowing down the hearths as they flow from one hearth to the next.

Mounted over the hearths 15 $15^a$ $15^b$, and preferably near to their lower ends, are the hoppers 18 $18^a$ $18^b$, and in the bottom of these hoppers are feed-drums 19. It will be observed that these hoppers are situated over and approximately at the center of the by-path flues 12. The fluxing materials, lime, &c., are introduced through these hoppers, and the material passed through them is deposited upon the surface of the material passing over the hearths 15 $15^a$ $15^b$ immediately prior to the entrance of such material into the passages 16 $16^a$ $16^b$, and therefore immediately prior to the time when the combined materials—i. e., the sand, fluxes, lime, carbon—are brought into the influence of the electric arcs formed between the electrodes 17 $17^a$ $17^b$.

The purpose of the by-paths 12 will now be understood, which is to carry the outgoing products of combustion, heat, &c., around the points of deposition of the fluxes, lime, carbon, &c., on the surface of the material upon the inclined hearths, and thus prevent the outgoing currents from picking up and carrying off the finely-divided particles of soda, lime, carbon, &c.

The heating of the furnace is accomplished through the instrumentality of the hydrocarbon-burners 20. Such burners are shown as introduced through the roof 7 of the furnace and at various points along the flue or passage 9. I do not limit myself to the disposition shown for such burners or their number. A sufficient number should be employed to create the required temperature and preferably disposed as to direct their flames not to impact upon the walls of or the materials in the tank or flues, but to permit free development of flame, and thus heat by radiation.

The mode of operation of my improved furnace is as follows: Sand is introduced into the hopper 13. If desired, this sand may have mixed with it a small percentage of lime, soda, salt cake, or other fluxing material. Preferably but small quantities of these materials should be incorporated with the sand. The sand under the action of the feed-drum 14 is thrown on the hearth 15 and gradually works its way down the hearth 15 toward the electric arcs 17. I have shown no means other than the gravital action of the sand for moving it along this hearth. Manifestly any well-known means—such as a reciprocating rake, chain traveler, or other device—may be employed. In practice I find that if the inclination of the hearth is sufficient the slightly-fluxed sand will flow by gravity, while on the hearth 15 the preliminary heating of the sand is effected. This thoroughly dries the sand, drives off a portion of the water of crystallization, and produces a partial combination between the sand and the fluxes, lime, &c. The partially-fluxed sand and lime cover the surface of the hearth and first form a silicious coating, which is held in position by the chill imparted to it by the cooled hearth, and thus serves to protect the hearth from the scoring action of the fluxes. When the partially fluxed and melted sand and lime not held on the hearth reach the lower portion of the hearth, a definite quantity of divided flux, lime, &c., is introduced through the hopper 18 and deposited upon the surface of the moving stream or body of partially-fluxed lime and sand. The stream or body in its movement downward then moves or falls through the electric arcs 17 and while passing these arcs is subjected to a very high temperature—i. e., a temperature considerably higher than can be obtained in any type of metallurgical furnace heated by fuel or gas. The effect of the temperature of the arcs is to produce an intimate combination between the bodies passing through it which fall upon the hearth $15^a$. As the stream or body passes along this hearth a second charge of the fluxing materials—lime, carbon, &c.—is charged upon the opposite surface of the stream or body, which is again transmitted through a series of arcs in the passage $16^a$, thence onto the hearth $15^b$, through the arcs $17^b$, onto the hearth $15^c$, thence into the tank. When delivered in the tank, the materials are in a perfectly-combined condition. Consequently the size of the tank may be only such as may be necessary to hold the required quantity of glass to accommodate the number of blowers employed, as no vertical fining or further combination of the materials is effected within the tank. It will be understood that the temperature of the tank can be controlled to effect the required planing of the glass—i. e., bringing the glass to the required tenacity or degree of fluidity necessary for blowing, casting, &c. When the furnace is used as a smelting-furnace, it is necessarily provided with slag and metal spouts.

It will be observed that the products of combustion and heat rising from the tank do not pass through the passages $16^b$ $16^a$ 16 on the way to the chimney-flue, but through passage 9 and by-paths 12 around the arcs and around the points of entrance of the fluxes, &c., and, further, that the temperature of the flue or passage 9 from the point of entrance of the sand or partially-fluid materials through the hopper 13 to the point of discharge into the tank is a gradually-increasing one, which is the condition desired in practice to obtain the best results.

In the manufacture of glass the employment of an electric arc or arcs as described is desirable, but not essential. It or they may be dispensed with, as the heat required to effect combination of the materials may be otherwise obtained. In the separation of a metal from its ores they are necessary to obtain the best results, as the temperatures which can be obtained in the furnace without their use are not sufficient to produce the requisite combination between the ore-body, the fluxes, carbon, &c., introduced.

As before stated, I do not limit myself in any wise to the particular features of construction of the furnace shown, as the drawings are only intended to illustrate the general features of construction and the principle of operation involved in the furnace—i. e., successive introduction of fluxing or flux and lime charges upon opposite surfaces of the material treated, preferably at points of quiescent atmosphere, and, if desired, the treatment of the fluxed material immediately after fluxing by the high temperature of an electric arc.

The practical effect of the furnace described is a large reduction of the fluxing materials—lime, carbon, &c.—very rapid combination of the materials, and finally the production of glass of uniform quality or, where an ore is treated, of matte or metal.

Having thus described my invention, I claim—

1. A metallurgical furnace embodying in its construction, a series of inclined and connected hearths, means for introducing the material to be acted on upon the uppermost hearth, means for depositing upon the moving material at successive points along its line of travel, fluxes or other combining bodies, a tank-furnace connected to the lowermost hearth, and means for heating said furnace and hearths.

2. A metallurgical furnace embodying in its construction, a heated passage through which the material to be acted on is moved, means for charging onto said moving material at different points in its line of travel successive charges of fluxes or other combining bodies, and means for diverting the ascending heated currents in said passage around the points where such charges are delivered upon the moving body.

3. A metallurgical furnace embodying in its construction, a passage through which the material to be acted upon is moved, means for heating such passage, means disposed along such passage through which charges of fluxes or other combining bodies may be successively delivered upon the moving material, and means situated in advance of said last-named means adapted to subject the moving material after each charge has been delivered upon it to the physical effects of an electric arc.

4. A metallurgical furnace embodying in its construction, a series of oppositely-inclined connected hearths, means for feeding the material to be acted on upon the upper end of the uppermost hearth, and means for discharging upon one surface of the material as it passes over one hearth and upon the opposite surface of the material as it passes over the succeeding hearth charges of fluxes or other combining materials.

5. A metallurgical furnace embodying in its construction, a series of oppositely-inclined connected hearths, means for feeding the material to be acted on upon the uppermost of said hearths, means for discharging upon successively-opposite surfaces of said material passing over said hearths, successive charges of fluxes or other combining materials, and means for subjecting the material after the introduction of each fluxing or combining charge to the temperature action of an electric arc.

6. A metallurgical furnace embodying in its construction, a series of oppositely-inclined and connected hearths, means for introducing the material to be acted on upon the uppermost hearth, means for depositing upon successive surfaces of the moving material successive charges of fluxes or other combining bodies, a tank-furnace connected to the lowermost hearth, an exit-flue connected to the uppermost hearth, and means for heating said furnace and hearths.

7. A metallurgical furnace embodying in its construction, a series of oppositely-inclined and connected hearths, means for introducing the material to be acted on upon the uppermost hearth, means for depositing upon successive surfaces of the moving material successive charges of fluxes or other combining bodies, means for subjecting the material in its passage from one hearth to the next to the temperature action of an electric arc, a tank-furnace connected to the lowermost hearth, an exit-flue connected to the uppermost hearth, and means for heating said furnace and hearths.

8. A metallurgical furnace embodying in its construction, a series of oppositely-inclined and connected chambers, a passage introduced between each pair of chambers, electrodes in said passages, a passage connecting each chamber whereby the products of combustion and heated gas will be carried around the passages containing the electrodes.

9. A metallurgical furnace embodying in its construction, a series of oppositely-inclined and connected chambers, a passage introduced between each pair of chambers, electrodes in said passages, a passage connecting each chamber whereby the products of combustion and heated gas will be carried around the passages containing the electrodes, a tank-furnace connected to the lowermost of said chambers, and an exit-flue connected to the uppermost of said chambers.

10. In a metallurgical furnace, the combination with a receiving vessel, of means whereby the material to be acted on is caused to move as a thin body over a series of oppositely-inclined hearths, means for depositing upon the surface of said moving material at different points in its line of travel, definite charges of fluxes or other combining material, and means for heating the materials and fluxes.

11. In a metallurgical furnace, the combination with a receiving vessel, of means whereby the material to be acted on is caused to move as a thin body over a series of inclined hearths, means for depositing upon the surface of said moving material at different points in its line of travel, definite charges of fluxes or other combining material, and means for heating said moving material between each introduction of the charge to approximately the temperature of an electric arc.

12. In a metallurgical furnace, the combination with a receiving vessel, of means whereby the material to be acted on is caused to move as a thin body over a series of inclined hearths, means for depositing upon the surface of said moving material at different points in its line of travel and in a quiescent atmosphere, definite charges of fluxes or other combining material.

13. A metallurgical furnace embodying in its construction, a series of oppositely-inclined and connected hearths, means for feeding the material to be acted on upon the uppermost of said hearths, means for charging fluxes or other combining materials onto the surface of the material as it passes over each hearth, and means for subjecting said material to a high temperature as it passes from one hearth to the next.

14. A metallurgical furnace embodying in its construction, a series of inclined, heated and connected chambers, means for feeding the material to be acted upon into the uppermost chamber, means for fluxing the material acted on as it passes through each chamber, and means for subjecting the material acted upon to a temperature higher than that in the chamber as it passes from one chamber to the next.

In testimony whereof I affix my signature in the presence of two witnesses.

GEO. H. BENJAMIN.

Witnesses:
J. E. PEARSON,
FRANK O'CONNOR.